United States Patent [19]

Devaud

[11] 4,414,881

[45] Nov. 15, 1983

[54] HYDRAULIC CONTROL DEVICE

[75] Inventor: Gérard L. Devaud, Paris, France

[73] Assignee: Societe d'Applications des Machines Motrices, Issy-les-Moulineaux, France

[21] Appl. No.: 227,111

[22] Filed: Jan. 21, 1981

[30] Foreign Application Priority Data

Jan. 25, 1980 [FR] France ............................... 80 01592

[51] Int. Cl.³ ......................... F01B 15/00; F16J 11/04

[52] U.S. Cl. .................................... 91/216 R; 92/128; 92/166; 92/171

[58] Field of Search ................... 92/171, 128, 59, 144, 92/166; 91/216 R, 216 A

[56] References Cited

U.S. PATENT DOCUMENTS

| | | | |
|---|---|---|---|
| 3,158,068 | 11/1964 | Bokelman | 91/216 A |
| 3,176,721 | 4/1965 | Gordon | 91/216 R |
| 4,050,359 | 9/1977 | Mayer | 92/171 |
| 4,207,807 | 6/1980 | Takata et al. | 92/128 |

*Primary Examiner*—Paul E. Maslousky

*Attorney, Agent, or Firm*—Sughrue, Mion, Zinn, Macpeak and Seas

[57] ABSTRACT

The invention provides a hydraulic servo-control device which performs the same functions as a conventional device but is much cheaper to manufacture and maintain.

For this purpose, the control device comprises a cylinder device formed by a cylinder and a piston rigid with a rod and a hydraulic control unit whose body is rigid with the cylinder. The body of the hydraulic control unit defines a cavity for receiving the cylinder of the cylinder device and this cylinder is made in two main parts, namely a case partly received in the cavity and fixed to the body of the hydraulic control unit, and a tubular sleeve which is axially and radially positioned inside the case and the cavity and cooperates with the piston.

Application in particular in the control of the pitch of the blades of a helicopter or the ailerons of a light aircraft.

6 Claims, 3 Drawing Figures

HYDRAULIC CONTROL DEVICE

The present invention relates to hydraulic control devices such as those employed in particular, although not exclusively, in a rotor mast of a helicopter for controlling the general or collective pitch, the cyclic pitch, and/or the lateral or wash pitch of the rotor blades.

Such a device comprises, in a known construction, a cylinder device having a cylinder body of treated light alloy machined in such manner as to define a cylindrical chamber with which cooperates a piston, and various pipes and passages which are part of the hydraulic circuit. In or on said cylinder body there are fixed in a conventional manner bearings and end walls or covers and a hydraulic control unit which is arranged in such manner as to achieve a servo-control of the moving element of the device which, in the particular application envisaged hereinbefore, is formed by the cylinder body itself, the piston rod being maintained in a fixed position. Another arrangement is also known in which the cylinder body and the hydraulic unit are die cast in a single piece and then machined as in the preceding example.

These two constructions are expensive, on one hand, owing to the surface treatment that the material employed must undergo in order to resist friction and, on the other hand, owing to the manufacturing process employed, the machining of the cylinder body and of the hydraulic control unit constituting a delicate stage bearing in mind the number and the precision of the operations. Another serious drawback resides in the maintenance cost since, in the event of partial wear, the whole of the cylinder body must be changed. Moreover, such a cylinder body is relatively heavy and this is an additional drawback in most of the contemplated applications thereof.

An object of the invention is mainly to provide a control device which performs the same functions but is distinctly cheaper to manufacture and maintain and is also lighter.

In such a device, of the type comprising a cylinder device having a cylinder and a piston rigid with a rod, and a hydraulic control unit whose body is rigid with the cylinder, the body of the hydraulic control unit defines a cavity for receiving the cylinder of the cylinder device and said cylinder is made in two main parts: a case partly received in the aforementioned cavity is fixed to the body of the hydraulic control unit, and a tubular sleeve positioned axially and radially within the case and the cavity and cooperative with the piston.

According to other features of the invention:

the case and the cavity each contain an end member which may possibly form a bearing and which defines with the sleeve and the piston two chambers of the cylinder device, the sleeve being fitted on cylindrical surfaces of said two end members and bearing axially against two radial shoulders of said end members, a pre-stressing compressive force being exerted on the sleeve when fixing the case on the body of the hydraulic control unit;

an annular chamber is defined between, on one hand, the sleeve and, on the other hand, the case and the adjacent walls of the cavity formed in the body of the hydraulic control unit, said annular chamber acting as a supply passage for one of the chambers of the cylinder device;

preferably, the piston rod extends through the piston and is received in two bearings defined by said end members.

In the particular application contemplated at the beginning of the present specification, the case may be so constructed that it constitutes both the actuating element connected to the swash plate which is part of the mechanism varying the pitch of the blades.

The invention will be described in more detail hereinafter with reference to the accompanying drawing which is given merely by way of example and in which.

Figure 1:
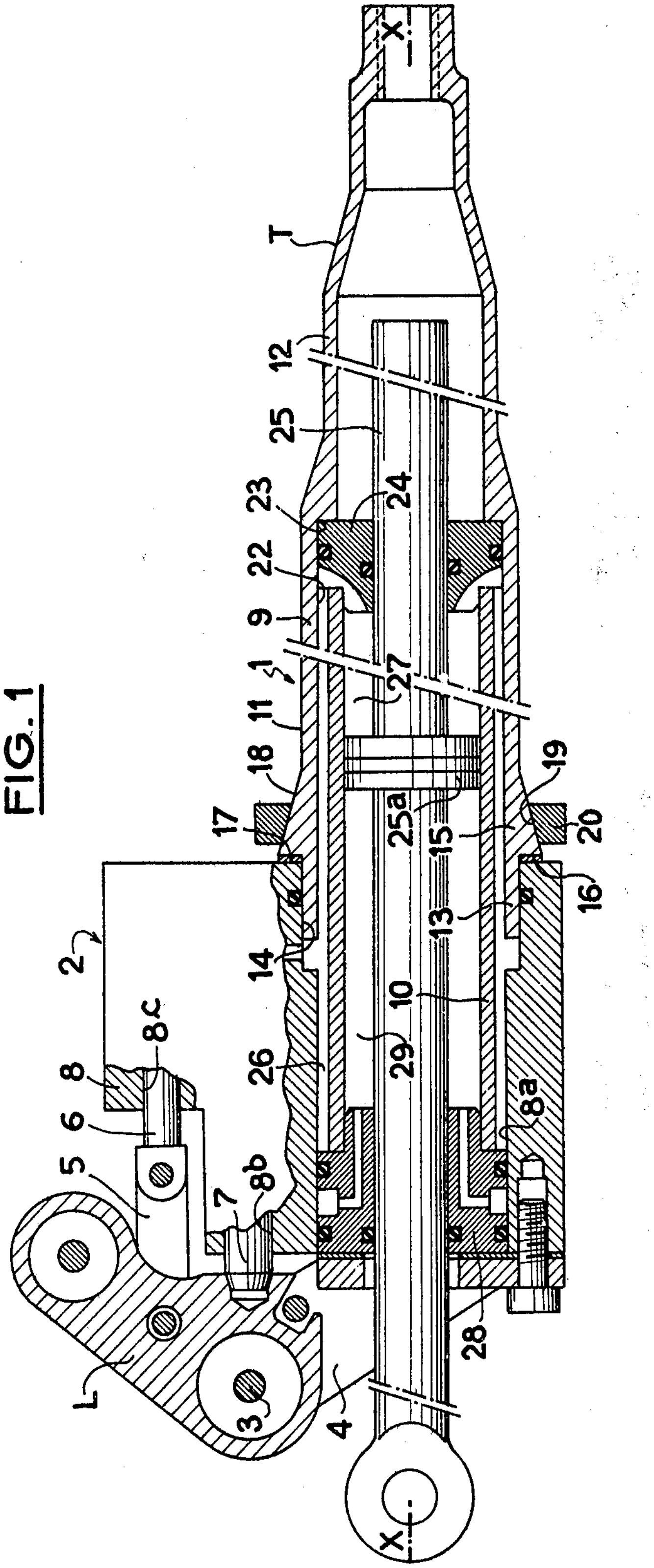
FIG. 1 is a view, partly in section and partly in elevation, of a device according to the invention.

FIG. 1 shows a hydraulic control device according to the invention which may be for example employed for varying the pitch of the blades of a helicopter or for controlling an aileron of a light aircraft. In the first of these applications, this device is connected on the upstream side thereof by a linkage to a control element actuated by the pilot and on the downstream side thereof it is connected to the mechanism proper for varying the pitch, in the present instance, to the lower element of the swash plate (not shown). However, it must be understood that such a device may have many other different applications with the same advantages.

The input element is consequently here formed by a lever L and the output element is formed by a "trumpet" T.

The device mainly comprises a cylinder device 1 having an axis X-X and controlled hydraulically and a servo-control unit 2 the functions of which will be explained with reference to FIG. 3. The lever L is pivotally mounted at 3 on a support 4 connected to the unit 2. It is connected by a connecting rod 5 to a slidable spool 6 and may be locked with respect to the unit 2 by a lock 7.

The hydraulic servo-control unit comprises a body 8 which has extending therethrough three passageways 8*a*, 8*b*, 8*c* whose axes are parallel and in which are received respectively the cylinder device, the lock 7 and the spool 6 and the sleeve for the latter. This unit further comprises two end surfaces which are perpendicular to the axis X-X. It is preferably produced by passing light alloy through a draw die, the section member obtained being thereafer cut into sections of the required length and machined.

Figure 2:
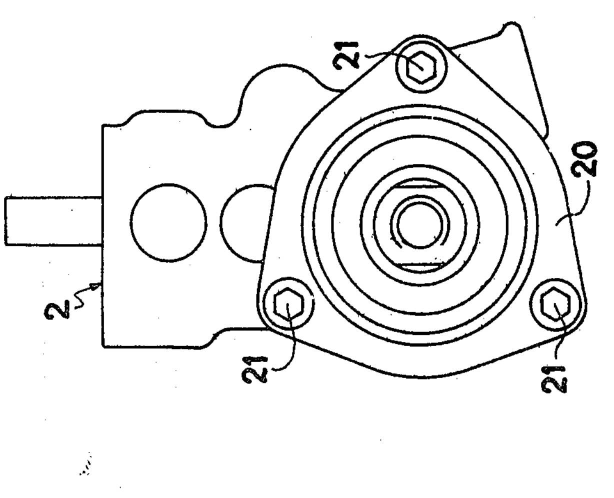
FIG. 2 is a side elevational view of the device as viewed from the right in FIG. 1.

The cylinder device comprises two main parts: a case 9 and a sleeve 10. The case 9 has a part 11 which is substantially cylindrical and extended by a part 12 whose section progressively decreases and constitutes the "trumpet" T. This case also has an end skirt portion 13 which is fitted, with interposition of a sealing element, in a portion 14 of larger diameter of the cavity 8*a*, and an outer flange 15 defining a substantially radial surface 16 which bears against the adjacent surface 17 of the unit and a frustoconical surface 18 on which is engaged a surface of complementary shape 19 of a flange 20 for fixing to the unit. The type of fixing employed is shown in FIG. 2 and it can be seen that three fixing screws 21 are provided which are spaced equal distances apart and arranged in such manner that the fracture of one thereof does not result in a tipping of the flange or a modification of the state of the whole of the device. The case further comprises a cylindrical inner surface 22 and an inner radial shoulder 23 which permits the positioning and the abutment of a first end member 24 which constitutes, on one hand, support means for the sleeve 10 and, on the other hand, a bearing for the piston rod 25.

The sleeve 10 has an outside diameter which is slightly less than the diameter of the bore 22 of the case and is also slightly less than the diameter of the cavity 8*a* defined in the control unit. It thus defines with these two parts an annular chamber 26 which, in the presently described-embodiment, is always in communication with the chamber 27 of the cylinder device defined between said sleeve, the piston, the piston rod and the end member 24.

The device is completed, in the left part of FIG. 1, by a second end member 28 which is mounted, with interposition of a sealing element, in the cavity 8*a* of the control unit and which acts, on one hand, as an axial and radial support for the sleeve 10 and, on the other hand, as a bearing for the rod 25 and thus performs a function similar to that performed by the member 24. An end cover, here formed by the support 4, is fixed on the control unit and completes the assembly in that it blocks the member 28. The second chamber of the cylinder device is designated by the reference numeral 29.

The piston rod 25 extends, in the presently-described embodiment, through the piston proper 25*a* with which it is rendered rigid by any suitable means, and said rod may be formed by a hollow tube.

Figure 3:
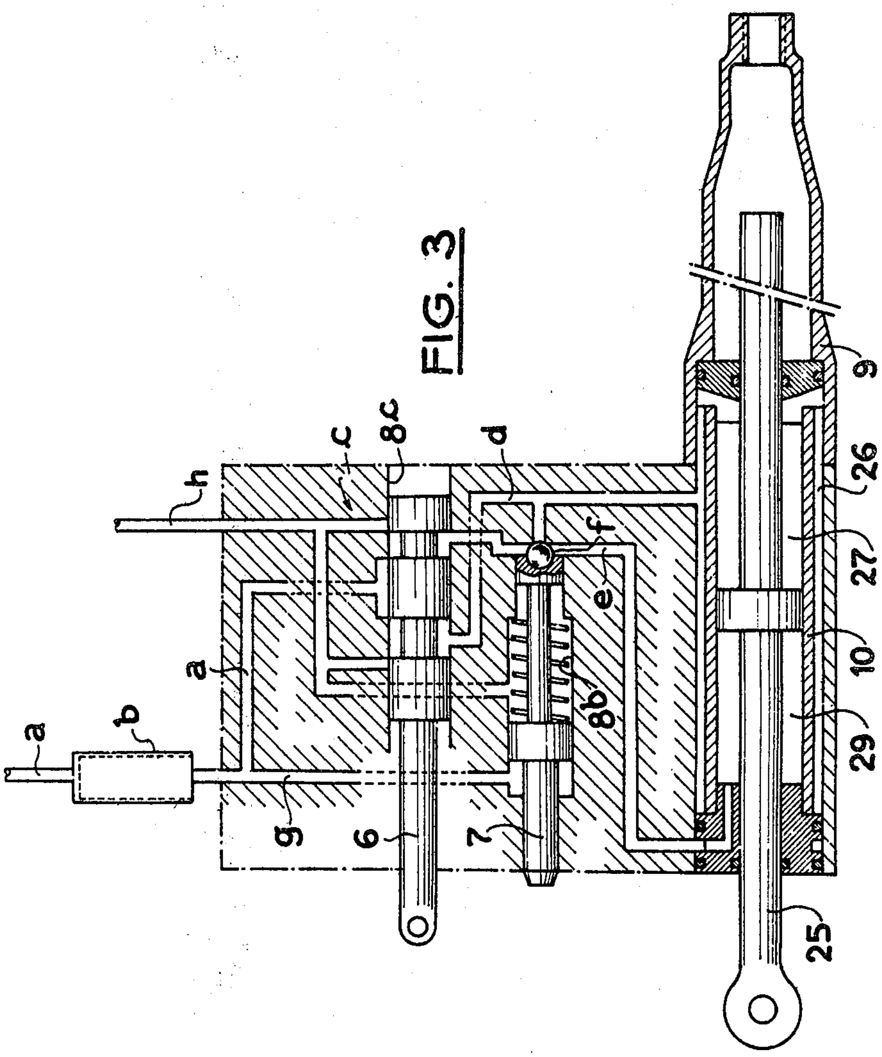
FIG. 3 is a hydraulic diagram of the device.

The brief description of the hydraulic servo-control circuit is as follows (FIG. 3). There is supplied from a source of fluid under pressure (not shown) by way of a pipe a, with interposition of a filter b, a directional valve c having three bearing surfaces so that it is possible to supply fluid selectively to two pipes d, e respectively connected to the chambers 27 and 29 of the cylinder device. The pipe d in fact opens onto the annular chamber 26 which is connected to the chamber 27. The pipe e extends through the rear part of the bore 8*b* of the lock 7 whose inner end acts on a valve f which is capable of opening or closing the communication between the two pipes d and e. A pipe g supplies the fluid under pressure to the front part of the bore 8*b* and there is also provided a return path h leading from the directional valve to a sump.

The operation of this assembly is simple: in normal use, any displacement of the actuating lever L in a direction parallel to the axis X-X causes the disengagement of the lock 7 and the closure of the valve f, and then a displacement of the spool 6 of the directional valve and the selective supply of fluid to one or the other of the two chambers 27 and 29 of the cylinder device. The supply of fluid to one or the other of said two chambers results in a displacement in the desired direction of the moving part of the cylinder device formed by the whole of the cylinder and the control unit, since the piston rod is fixed.

It will be observed that, from the point of view of the hydraulic operation of the device, the use of the annular chamber 26 as a supply passageway for the chamber 27 results in the establishment of an equal pressure on each side of the sleeve 10 throughout the length of the chamber 27, which eliminates in this part any differential pressure force on the sleeve. In the remaining part of this sleeve, corresponding to the length of the chamber 29, a pressure difference may exist but which remains within reasonable limits, for example of the order of one half of the nominal pressure which may be itself for example 40 to 50 bars.

Consequently, in association with the fact that this sleeve is subjected to an axial compressive pre-stressing force, it can have a relatively thin wall. This sleeve indeed does not intervene in the transmission of the forces which is effected in normal operation through the case and the hydraulic fluid. In the event of failure of the hydraulic circuit, the lock 7 locks the lever L with respect to the unit 2 and the pipes d and e are put into communication. The moving assembly is then displaced at the same time as the lever L and the force is transmitted directly through the unit 2 and the case 9.

The separation of the functions which is achieved in the construction according to the invention permits the choice for each element of a suitable structure and a particularly cheap manner of manufacture. Thus, the case may be produced by hammering or die casting and a drawing operation if it is of light alloy or by moulding and/or winding if it is of plastic resin of high strength. As concerns the sleeve which is also of light alloy, it is merely formed by a calibrated tube which is cut to length and treated. Likewise, the control unit may be manufactured by a drawing operation carried out on an aluminium alloy or a moulding of a high-strength plastic resin, the complementary machining operations being much smaller in number. This device may thus have a weight which is substantially reduced with respect to that of a device manufactured by conventional methods.

Having now described my invention what I claim as new and desire to secure by Letters Patent is:

1. A hydraulic control device for helicopters and aircraft of the type comprising a cylinder device (1) having a cylinder and a piston (25*a*) rigid with a rod (25), and a hydraulic control unit (2) having a body which is rigid with the cylinder, the body (8) of the hydraulic control unit defining a cavity for receiving the cylinder of the cylinder device, and said cylinder comprising two main parts, namely a case (9) fixed to the body of the hydraulic control unit, and a tubular sleeve (10) which is positioned axially and radially inside the case and the cavity and cooperates with the piston, wherein the case and the cavity each contain an end member (24, 28) which has a cylindrical bearing surface and a radial shoulder and defines with the sleeve and the piston two chambers (27, 29) of the cylinder device, the sleeve being fitted on the cylindrical surfaces of said two end members and bearing axially against the two radial shoulders of said end members, the sleeve being subjected to an axial compressive prestressing force when fixing the case to the body of the hydraulic control unit, wherein the piston and rod are fixed such that the selective application of pressurized hydraulic fluid to one of the two chambers causes movement of the hydraulic control unit body and the case fixed thereto, and wherein the case has an outer flange (15) which defines a substantially radial surface (16) bearing against an adjacent surface (17) of the unit, and a frustoconical surface (18) on which is engaged a surface (19) of complementary shape of a flange (20) for fixing to the unit.

2. A device according to claim 1, wherein an annular chamber is defined between, on one hand, the sleeve and, on the other hand, the case and an adjacent wall of the cavity formed in the body of the hydraulic control unit, said annular chamber acting as a passageway for supplying fluid to one of the chambers of the cylinder device.

3. A device according to claim 1, wherein the cavity constitutes a stepped bore whose part of larger diameter receives, with interposition of a sealing element, an end portion of the case.

4. A device according to any one of the claims 1, 2, 3 or 8, wherein the case also constitutes connecting means connected to controlled mechanism.

5. A device according to claim 1, wherein the body of the servo-control unit comprises three parallel passageways which are formed in the course of the initial operation for manufacturing said body.

6. A hydraulic control device according to claim 1, wherein said case is partly received in said cavity.

* * * * *